United States Patent
Lee et al.

(10) Patent No.: US 8,666,199 B2
(45) Date of Patent: *Mar. 4, 2014

(54) GESTURE-BASED SELECTION TEXT RECOGNITION

(71) Applicant: Google Inc., Mountain View, CA (US)

(72) Inventors: Dar-Shyang Lee, Union City, CA (US); Lee-Feng Chien, Taipei (TW); Pin Ting, SanChong (TW); Aries Hsieh, Xindian (TW); Kin Wong, Languna (HK)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/952,457

(22) Filed: Jul. 26, 2013

(65) Prior Publication Data
US 2013/0335356 A1    Dec. 19, 2013

Related U.S. Application Data

(63) Continuation of application No. 12/575,015, filed on Oct. 7, 2009, now Pat. No. 8,520,983.

(51) Int. Cl.
*G06K 7/00*   (2006.01)
*G06K 9/32*   (2006.01)

(52) U.S. Cl.
USPC ............................ 382/312; 382/293; 345/173

(58) Field of Classification Search
CPC ..... G06K 9/228; G06K 9/325; G06K 9/3266; G06K 9/34; G06K 9/3275; G06K 9/3283; G06K 9/344; G06K 2209/01; G06F 3/04883; G06F 3/03545; G06F 3/04886; G06F 2203/04808; G06F 17/243; H04N 1/00411; H04N 2201/3266

See application file for complete search history.

(56) References Cited

U.S. PATENT DOCUMENTS

| | | | | |
|---|---|---|---|---|
| 5,224,180 A | * | 6/1993 | Tadokoro | 382/181 |
| 5,237,627 A | | 8/1993 | Johnson et al. | |
| 5,252,951 A | * | 10/1993 | Tannenbaum et al. | 345/156 |
| 5,321,520 A | * | 6/1994 | Inga et al. | 358/403 |
| 5,465,317 A | | 11/1995 | Epstein | |
| 5,590,224 A | * | 12/1996 | Fast et al. | 382/291 |
| 5,594,814 A | * | 1/1997 | Fast et al. | 382/254 |
| 5,684,891 A | * | 11/1997 | Tanaka et al. | 382/178 |
| 5,768,417 A | * | 6/1998 | Errico et al. | 382/186 |
| 5,796,406 A | * | 8/1998 | Shigematsu et al. | 715/863 |
| 5,850,480 A | * | 12/1998 | Scanlon | 382/229 |
| 5,880,743 A | * | 3/1999 | Moran et al. | 345/473 |
| 5,889,518 A | * | 3/1999 | Poreh et al. | 715/804 |
| 5,960,448 A | * | 9/1999 | Reichek et al. | 715/236 |

(Continued)

FOREIGN PATENT DOCUMENTS

KR    20070028253 A    3/2007
KR    20080070872 A    7/2008

*Primary Examiner* — Manav Seth
(74) *Attorney, Agent, or Firm* — Fenwick & West LLP

(57) ABSTRACT

An image is displayed on a touch screen. A user's underline gesture on the displayed image is detected. The area of the image touched by the underline gesture and a surrounding region approximate to the touched area are identified. Skew for text in the surrounding region is determined and compensated. A text region including the text is identified in the surrounding region and cropped from the image. The cropped image is transmitted to an optical character recognition (OCR) engine, which processes the cropped image and returns OCR'ed text. The OCR'ed text is outputted.

20 Claims, 6 Drawing Sheets

(56) References Cited

U.S. PATENT DOCUMENTS

| | | | | |
|---|---|---|---|---|
| 6,115,482 A | * | 9/2000 | Sears et al. | 382/114 |
| 6,249,283 B1 | * | 6/2001 | Ur | 715/764 |
| 7,216,305 B1 | * | 5/2007 | Jaeger | 715/849 |
| 7,593,605 B2 | * | 9/2009 | King et al. | 382/313 |
| 7,627,142 B2 | * | 12/2009 | Kurzweil et al. | 382/114 |
| 7,689,613 B2 | * | 3/2010 | Candelore | 707/707 |
| 7,830,362 B2 | * | 11/2010 | Finley | 345/157 |
| 7,990,561 B2 | | 8/2011 | Okabe | |
| 8,139,257 B2 | * | 3/2012 | Fabrice | 358/1.18 |
| 8,144,990 B2 | * | 3/2012 | Englund et al. | 382/181 |
| 8,155,444 B2 | * | 4/2012 | Simmons et al. | 382/176 |
| 8,231,389 B1 | * | 7/2012 | Berger et al. | 434/322 |
| 8,320,708 B2 | * | 11/2012 | Kurzweil et al. | 382/289 |
| 8,339,379 B2 | * | 12/2012 | Goertz et al. | 345/175 |
| 8,385,971 B2 | * | 2/2013 | Rhoads et al. | 455/556.1 |
| 2001/0056352 A1 | * | 12/2001 | Xun | 704/277 |
| 2005/0128181 A1 | | 6/2005 | Wang et al. | |
| 2007/0133074 A1 | * | 6/2007 | Fabrice | 358/537 |
| 2010/0331043 A1 | * | 12/2010 | Chapman et al. | 455/556.1 |
| 2011/0069089 A1 | * | 3/2011 | Kopf et al. | 345/690 |
| 2011/0069180 A1 | * | 3/2011 | Nijemcevic et al. | 348/207.1 |
| 2011/0123115 A1 | * | 5/2011 | Lee et al. | 382/185 |
| 2012/0131520 A1 | * | 5/2012 | Tang et al. | 715/863 |

* cited by examiner

GESTURE-BASED SELECTION TEXT RECOGNITION

RELATED APPLICATIONS

This application is a continuation of U.S. application Ser. No. 12/575,015, filed Oct. 7, 2009, which is hereby incorporated herein by reference.

BACKGROUND

1. Field of Disclosure

The disclosure generally relates to the field of image processing, in particular to recognizing text in images using optical character recognition (OCR).

2. Description of the Related Art

Many mobile phones on the market are equipped with cameras. The mobile phone users often use the equipped cameras to capture images containing text, such as business cards, road signs, logos, and printed materials. To further process the captured text, the pictures often are processed using Optical Character Recognition (OCR) technology to convert the text within into editable text. However, because a photo typically is fairly large in size and includes abundant textual and graphical information, the text the user is interested in, even if correctly recognized, will be hidden among other text generated from the photo. Thus, recognizing text of the user's interest using this approach is both inefficient and error prone.

Therefore, there is a need for a way to efficiently and accurately recognize the text of the user's interest in an image.

SUMMARY

Embodiments of the present disclosure include a method (and corresponding system and computer program product) for selectively recognizing text in an image based on a user's underline gesture.

One aspect of the present disclosure is a computer-implemented method for selectively recognizing text in an image, comprising: displaying the image on a touch sensitive display device; detecting a gesture associated with an area of the touch sensitive display device; identifying a text region in the image associated with the area of the touch sensitive display device, the text region comprising text; and recognizing the text in the text region using OCR technology.

Another aspect of the present disclosure is a computer-readable storage medium encoded with executable computer program code for selectively recognizing text in an image, the computer program code comprising program code for: displaying the image on a touch sensitive display device; detecting a gesture associated with an area of the touch sensitive display device; identifying a text region in the image associated with the area of the touch sensitive display device, the text region comprising text; and recognizing the text in the text region using OCR technology.

Still another aspect of the present disclosure is a computer system for selectively recognizing text in an image, comprising: a computer-readable storage medium comprising executable computer program code for: an image User Interface (UI) module for displaying the image on a touch sensitive display device and detecting a gesture associated with an area of the touch sensitive display device; a text region identification module for identifying a text region in the image associated with the area of the touch sensitive display device, the text region comprising text; and an OCR module for recognizing the text in the text region using OCR technology.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

FIG. (FIG.) 1 is a high-level block diagram of a computing environment according to one embodiment of the present disclosure.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
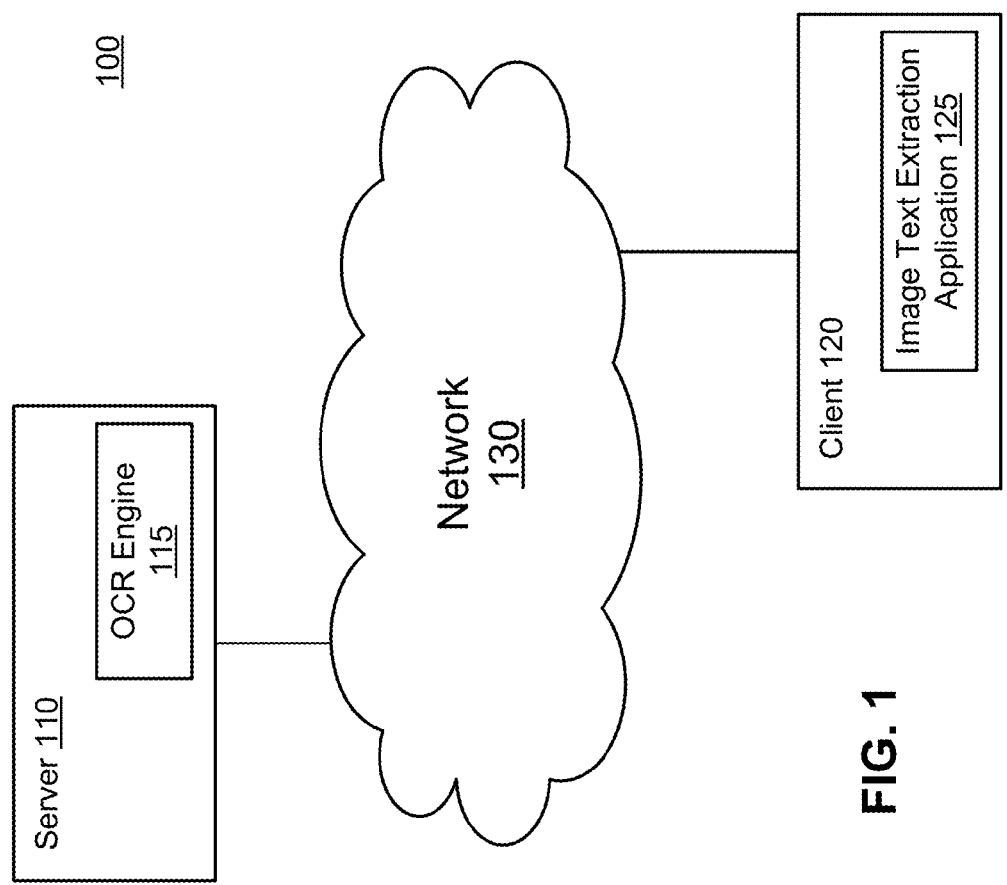

FIG. 1 is a high-level block diagram that illustrates a computing environment 100 for selectively recognizing text in an image based on a user's gesture, according to one embodiment of the present disclosure. As shown, the computing environment 100 includes a server 110 and a client 120 connected through a network 130. Only one of each entity is illustrated in order to simplify and clarify the present description. There can be other entities in the computing environment 100 as well.

The server 110 is a hardware device and/or software program configured to provide clients 120 or other systems with Optical Character Recognition (OCR) functions. As shown, the server 110 includes an OCR engine 115. The server 110 receives images containing text, recognizes text in the images using the OCR engine 115, and returns the recognized text in a symbolic form editable by computers. An example of the server 110 is a web server that provides an OCR service.

The OCR engine 115 is a hardware device and/or software program configured to convert (or translate) text inside images into editable text (hereinafter called OCR'ed text). The OCR engine 115 processes the images using computer algorithms and generates corresponding OCR'ed text. In addition, the OCR engine 115 calculates a garbage score that measures a quality of the OCR'ed text. The OCR engine 115 may generate multiple alternative OCR'ed texts along with their corresponding garbage scores for a same image. The OCR engine 115 may generate other information such as format information (e.g., font, font size, style). Examples of the OCR engine 115 include Abbyy FineReader, Nuance OmniPage, and Open Source Tesseract.

The client 120 is a computer system configured to enable a user to select text in an image through a user gesture, and collaborate with the server 110 to recognize the selected text. An example of the client 120 is a mobile phone equipped with a camera and a touch-sensitive screen (also called a touch sensitive display device or a touch screen). The client 120 includes an image text extraction application 125.

The image text extraction application 125 is a hardware device and/or software program configured to provide the user with a user interface to interact with an image (e.g., a photo) to select text within the image through user gestures such as an underline gesture. In one embodiment, in addition to or instead of interacting with still images, the user can interact with an image stream (e.g., live video displayed by a video camera in a viewfinder mode) through the user interface to select text in the image stream using underline gestures. An underline is a line adjacent to a section of text. The underline can be horizontal relative to an orientation of the image (e.g., "this quoted text is underlined"), vertical (e.g., for text of languages such as Chinese, Japanese, and Korean that are likely printed vertically), or inclined. An underline gesture is a user gesture that draws an underline on the displayed image. For example, the user can touch and slide on the touch screen (e.g., using a finger, a stylus pen) to draw an underline on the displayed image. For purpose of clarity, the following description assumes that an underline gesture draws a horizontal line below a horizontal line of text. Those of skill in the art will recognize that the techniques described herein also support vertical and/or inclined underlines. The image text extraction application 125 identifies a region within the image containing the selected text based on the user gesture, and transmits the image region to the server 110 for it to recognize the selected text. The image text extraction application 125 receives the OCR'ed text from the server 110 and avails it to the user.

The network 130 enables communications between the server 110 and the client 120. In one embodiment, the network 130 uses standard communications technologies and/or protocols. Thus, the network 130 can include links using technologies such as Ethernet, 802.11, worldwide interoperability for microwave access (WiMAX), 2G/3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including image data in binary form (e.g. Portable Network Graphics (PNG)), the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

Computer Architecture

Figure 2:
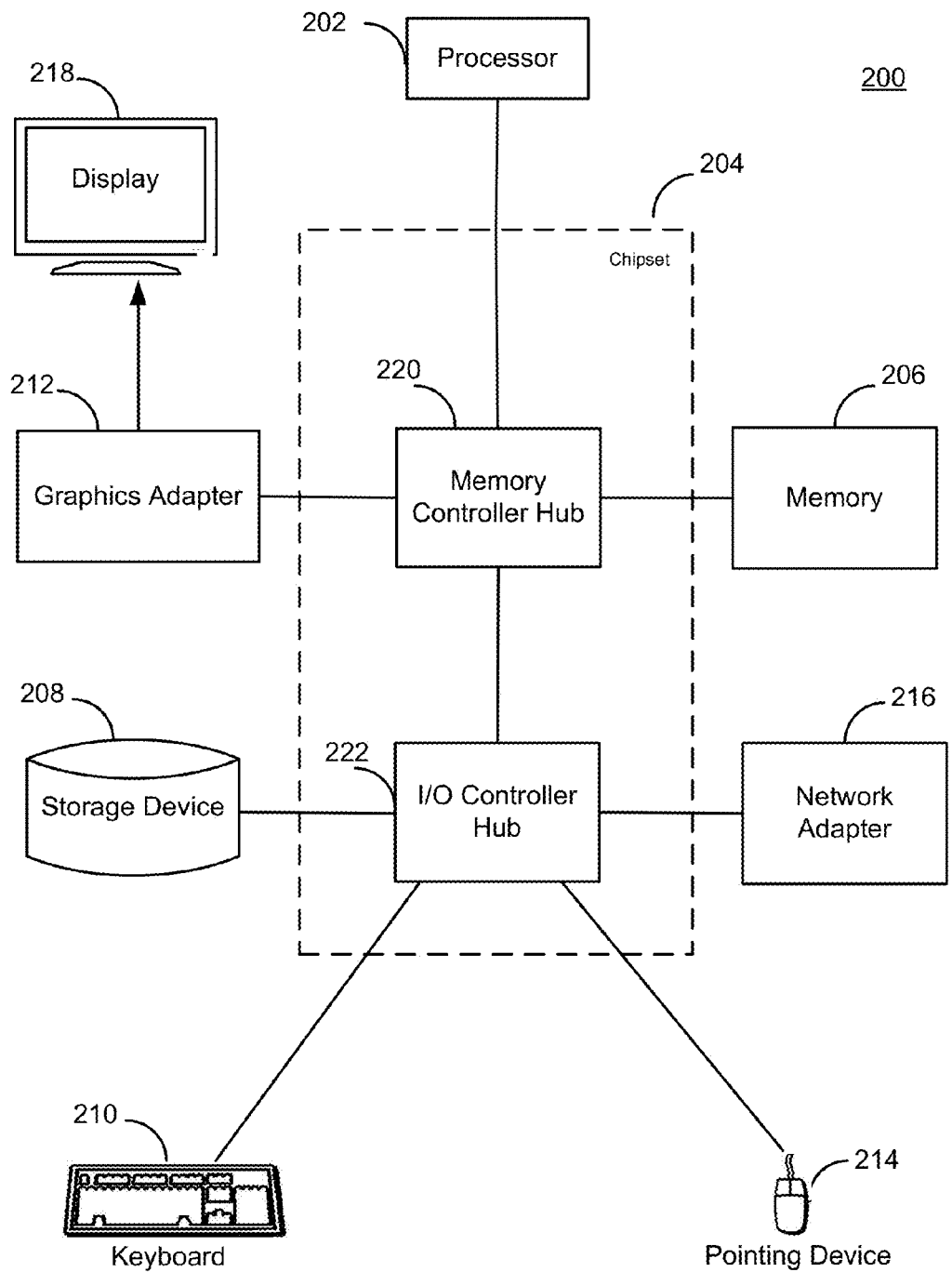
FIG. 2 is a high-level block diagram illustrating an example of a computer for use in the computing environment shown in FIG. 1 according to one embodiment of the present disclosure.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the server 110 might comprise multiple blade servers working together to provide the functionality described herein. As another example, the client 120 might comprise a smartphone with limited processing power. The computers 200 can lack some of the components described above, such as keyboards 210, graphics adapters 212, and displays 218. The server 110 and/or the client 120 can also be implemented as a virtual machine (VM) or run inside a VM. In addition, the server 110 and/or the client 120 can run in a single computer 200 or multiple computers 200 communicating with each other through a network such as a server farm.

Example Architectural Overview of the Image Text Extraction Application

Figure 3:
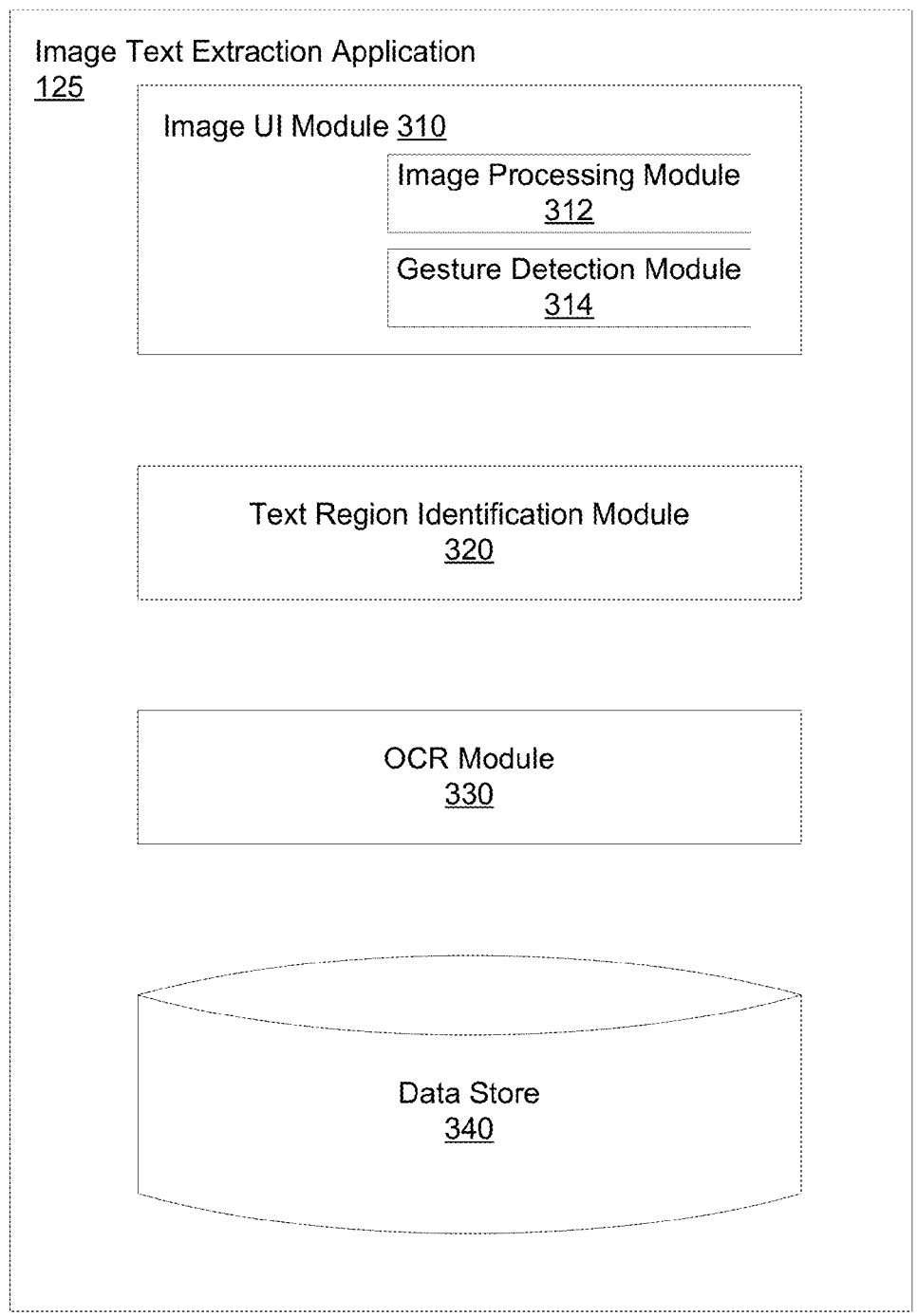
FIG. 3 is a high-level block diagram illustrating modules within an image text extraction application according to one embodiment of the present disclosure.

FIG. 3 is a high-level block diagram illustrating a detailed view of modules within the image text extraction application 125 according to one embodiment. Some embodiments of the image text extraction application 125 have different and/or other modules than the ones described herein. Similarly, the functions can be distributed among the modules in accordance with other embodiments in a different manner than is described here. As illustrated, the image text extraction application 125 includes an image User Interface (UI) module 310, a text region identification module 320, an OCR module 330, and a data store 340.

The image UI module 310 provides a user interface for the user to selectively view images available on the client 120 and interact with the displayed images through gestures. If the client 120 is equipped with a camera, the image UI module 310 can retrieve and display photos taken by the camera. The user can also use the image UI module 310 to view images from other sources, such as pictures downloaded through the network 130. If the image is displayed on a touch screen, the user can touch and slide on the screen (e.g., using a finger, a stylus pen) to make underline gestures on the displayed image. As shown, the image UI module 310 includes an image processing module 312 and a gesture detection module 314.

The image processing module 312 processes an image for an optimal display on the client 120. The image processing module 312 optimizes the image based on its properties (e.g., size, color, sharpness) and properties of the touch screen (e.g., resolution, color depth). For example, the image processing module 312 can resize the image to fit the touch screen, tune the image color based on the color depth of the screen, and/or adjust other attributes of the image such as its sharpness for an optimal display on the screen.

The gesture detection module 314 detects an underline gesture the user made on the touch screen, and identifies an area of the image displayed on the area of the touch screen the user touches through the gesture (hereinafter called the underline area or the area associated with the gesture). The gesture detection module 314 identifies the underline area by coordinating the location of the touch screen surface touched and the location and orientation of the image as displayed on the touch screen.

The text region identification module 320 identifies a text region selected by the user through an underline gesture on a displayed image. The text region identification module 320 analyzes a surrounding area of the underline area to detect the presence of a line of text, and identifies a portion that includes the line of text as the text region. An example of the text region is a rectangular-shaped bounding box containing the detected line of text. In one embodiment, the text region identification module 320 determines whether the detected line of text is skewed in the image, and corrects the skew before identifying the text region. The text region identification module 320 crops the text region from the displayed image by removing the portions outside the text region, and avails the cropped image to the OCR module 330 for further processing. Because the cropped image contains only the text the user expressed interest through the underline gesture, the cropped image is much smaller in size comparing to the displayed image and contains only information relevant to the user's interest.

The OCR module 330 converts text in the cropped image into editable text. The OCR module 330 transmits the cropped image to the server 110 for processing using OCR technology, and receives the resulting OCR'ed text from the server 110. In one embodiment, instead of or in addition to transmitting the cropped image, the OCR module 330 can transmit the original image together with co-ordinates of the identified text region to the server 110. In another embodiment, the OCR module 330 itself may provide OCR functions and can convert the cropped image into editable text locally. The OCR module 330 makes the OCR'ed text available to the user or feeds it to a relevant service or application (e.g., text search).

The data store 340 stores data used by the image text extraction application 125. Examples of such data include the images containing text, the OCR'ed text and associated information (e.g., garbage scores), and information about the server 110. The data store 340 may be a relational database or any other type of database.

Skew Detection and Correction

A line of text in a photo may deviate from a horizontal orientation of the photo. The angular deviation (also called skew) can be caused by factors such as the original orientation of the line of text and the angle of the camera when taking the photo. The skew can be expressed numerically as the deviation angle (also called skew angle). The presence of skew makes identifying and cropping a text region including the line of text difficult and may cause errors in the subsequent OCR process. Therefore, it is beneficial to detect and correct the skew for the user-selected text region.

In one embodiment, the text region identification module 320 detects skew by calculating projection profiles at a range of angles for a surrounding area of the underline area. The surrounding area can be defined as a rectangular box covering the underline area. The extent and relevant position of the surrounding area can be pre-defined and user-configured. For example, the top boundary of the rectangular box can be defined by a straight line parallel to the underline area and 30 (or 10% of the horizontal pixels of the display) pixels above. The other boundaries can be similarly defined. It is noted that the underline area is not necessarily a straight line. It may well be a curved line such as a wavy line. The direction and angle of a curved underline area can be determined by, for example, constructing and examining a line of best fit (i.e., the sum of the squares of the distances from the pixels in the underline area to the constructed line is a minimum).

A projection profile for the surrounding area at a particular angle is obtained by projecting the foreground pixels (i.e., pixels with a color different from the background) in the surrounding area on to an axis perpendicular to the angle. Each pixel line in parallel with the angle is represented on the projection profile by the number of foreground pixels on that line.

The angles for which projection profiles are calculated are determined based on an orientation of the underline area. For example, the angles may include the angle defined by the underline and the horizontal axis of the display (called the underline angle), and angles that are one or a multiple of a predetermined value (e.g., one degree (1°)) different from the underline angle and within a predetermined range (e.g., +/−15° of the underline angle). In this example, projection profiles for thirty-one angles (i.e., underline angle −15°, . . . , underline angle +15°) are calculated. The horizontal axis of the display can be determined based on an orientation or position of the client 120 (e.g., whether the client 120 is placed upright or on its side).

The projection parallel to the true alignment of a line of text is likely to have the maximum variance, since when parallel, each projected pixel either includes almost no foreground pixels (as it passes above or below the line of text) or many foreground pixels (while passing through the line of text). Therefore, the horizontal projection profile of the line of text is the projection profile with the most variance. Accordingly, the skew angle of the line of text is the angle of the horizontal projection profile. The presence of such variance in a projection profile can also be used by the text region identification module 320 to determine the presence of a line of text.

The text region identification module 320 corrects the skew by rotating the image (or the surrounding area) to compensate for the skew angle (i.e., to an opposite direction). The image rotation can be achieved by performing a coordinate transformation.

Text Region Identification

The text region identification module 320 identifies a text region in the surrounding area containing the line of text approximately above the underline area. As described above, the horizontal projection profile of the line of text has substantial variance between the pixel lines above and below the line of text and the pixel lines passing through it. The text region identification module 320 can use the pixel lines immediately above and below the line of text as the top and bottom boundaries of the text region containing the line of text.

The text region identification module 320 determines a left boundary and a right boundary of the text region by calculating a vertical projection profile (i.e., the projection profile of an angle perpendicular to the angle of the horizontal projection profile described above) of the surrounding area between the top and bottom boundaries. The vertical projection profile is characterized by a set of upright and tall peaks, between which are the character spacing (or word spacing). The text region identification module 320 determines the spacing approximate to the left end of the underline area as the left boundary, and similarly determines the spacing approximate to the right end of the underline area as the right boundary.

Overview of Methodology for the Image Text Extraction Application

Figure 4:
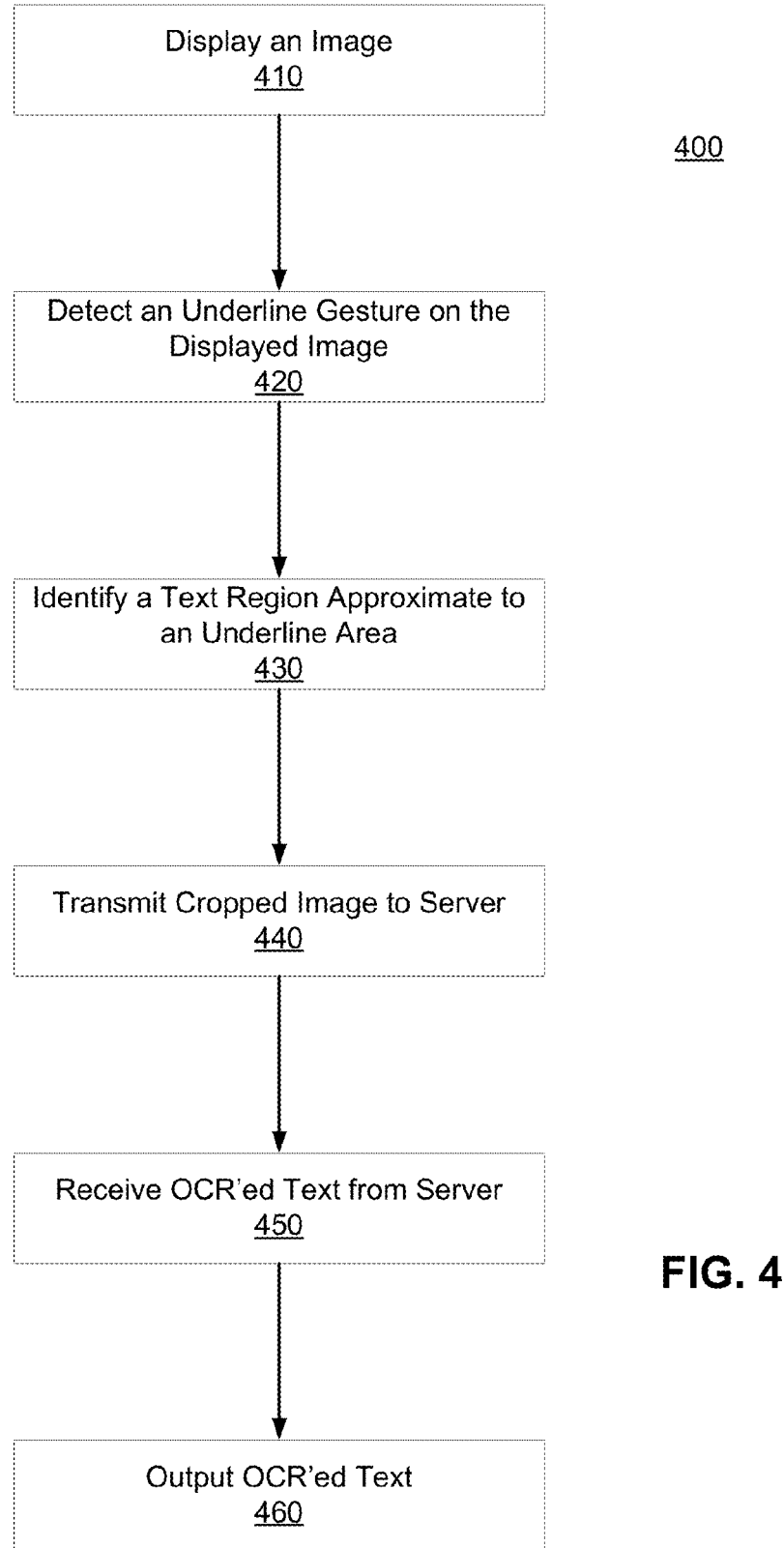
FIGS. 4 and 5 are flow diagrams collectively illustrating a process for selectively recognizing text in an image based on a user's underline gesture according to one embodiment of the present disclosure.

FIG. 4 is a flowchart illustrating a method 400 for the image text extraction application 125 to selectively recognize text in an image based on a user's underline gesture, according to one embodiment. Other embodiments can perform the steps of the method 400 in different orders. Moreover, other embodiments can include different and/or additional steps than the ones described herein.

Initially, the image text extraction application 125 displays 410 an image on a touch screen. Examples of the image include photos taken by a camera equipped on the client 120 and pictures retrieved from the Internet. The user can interact with the user interface provided by the image text extraction application 125 to select the image for viewing.

The image text extraction application 125 detects 420 an underline gesture on the displayed image. The user may touch the image displayed on the touch screen using a finger or a stylus pen and slide on the screen to underline a line of text (or a portion thereof) in the image. The image text extraction application 125 detects 420 the underline gesture and identifies the underline area on the displayed image, and identifies 430 a text region in the image proximate to the underline area. The identifying step 430 is illustrated in FIG. 5 and described in detail below.

Figure 5:
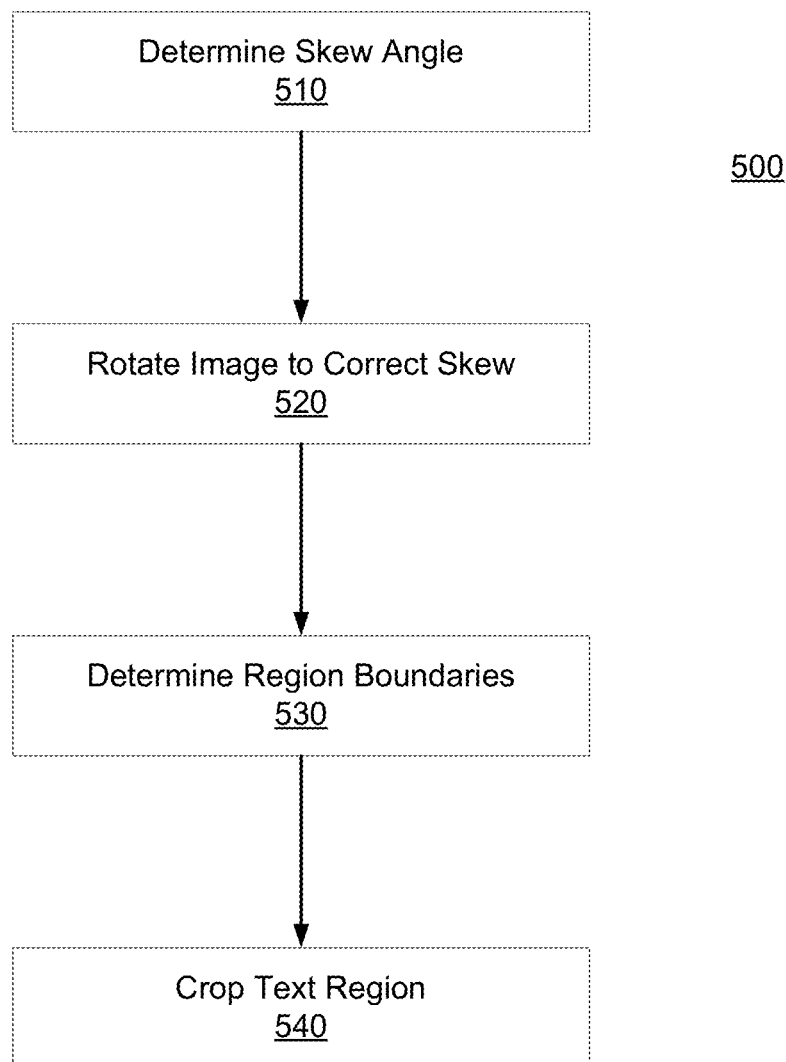

Referring now to FIG. 5, a flowchart illustrating a method 500 for the image text extraction application 125 to identify a text region in the image based on an underline gesture, according to one embodiment. As shown, the image text extraction application 125 determines 510 a skew angle of a line of text approximates to the underline area. The image text extraction application 125 can make the determination 510 by calculating projection profiles of a surrounding region in a range of angles (e.g., +/−15 degrees of an underline angle), and uses the angle of the projection profile with the most variance (i.e., the horizontal projection profile) as the skew angle.

The image text extraction application 125 rotates 520 the image (or the surrounding region) to correct the skew. The image text extraction application 125 determines 530 boundaries of a text region in the rotated image, and crops 540 the text region.

Referring back to FIG. 4, the image text extraction application 125 transmits 440 the cropped image containing the text region to the server 110, which processes the cropped image using OCR technology and returns OCR'ed text. The image text extraction application 125 receives 450 the OCR'ed text from the server 110 and outputs 460 the OCR'ed text.

For example, the image text extraction application 125 can display the recognized text to the user (e.g., next to the displayed image or overlaying on the image). The image text extraction application 125 may also output 460 the OCR'ed text to other functions or services available on the client 120. For example, the image text extraction application 125 may store the OCR'ed text in a clipboard such that the user can paste the text elsewhere (e.g., onto a text input box). As another example, the image text extraction application 125 may feed the OCR'd text to a search engine (e.g., GOOGLE SEARCH) for relevant information (e.g., articles, images).

The image text extraction application 125 may also analyze the OCR'ed text to determine its nature, and then feed it to relevant applications. For example, if the text comprises an address, then the image text extraction application 125 can feed the text to a mapping application (e.g., GOOGLE MAP) such that the mapping application can display local map or provide routing service based on a current location of the client 120 and the address.

Figure 6A:
FIGS. 6A through 6C are diagrams illustrating an example of selectively recognizing text in an image based on a user's underline gesture according to one embodiment of the present disclosure.
Figure 6B:
Figure 6C:
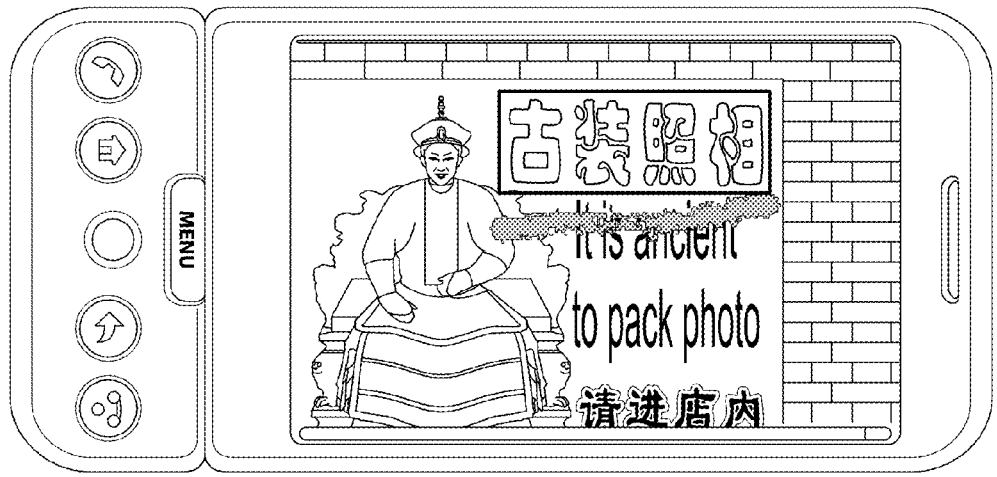

The above process can be further illustrated by an example with reference to FIGS. 6A through 6C. As illustrated in FIG. 6A, a smartphone (e.g., a T-MOBILE G1 PHONE) displays 410 a photo of a street advertisement for a photo shop. The photo includes an image of a person in an ancient costume and four lines of text describing an old time costume photo service.

FIG. 6B shows that the smartphone detects 420 a user underline gesture on the displayed photo. The underline area is shown in gray for clarity. As shown, the user underlined the first line of text in the image, which includes four Chinese characters that collectively stand for an old time costume photo service.

FIG. 6C shows that the smartphone identifies 430 a text region approximately above the underline area. The text region is illustrated by a rectangular frame, which may not be visible to the user or highlighted in other ways to provide user feedback. The text region is cropped and transmitted 440 to an OCR engine, which recognizes and returns the text (the four Chinese characters). The smartphone receives 450 and outputs 460 the text (e.g., feeds to a search engine). Even though the example illustrates how the process 400 selectively recognizes text in Chinese based on an underline gesture, the present disclosure can be utilized to recognize text of other languages, such as English, Japanese, and Korean, to name a few.

Additional Embodiments

In one embodiment, the OCR engine 115 and the image text extraction application 125 reside on a single device (e.g., a smartphone), such that the device can selectively recognize text in an image based on a user's underline gesture without communicating with any external computing device.

In one embodiment, user gestures recognized by the image text extraction application 125 are not limited to underline gestures. For example, the user can draw a line above or across a line of text. The user can also make other gestures such as drawing the boundary of an enclosed area (e.g., a circle, an ellipse, a box, etc.) on an image. The image text extraction application 125 identifies a text region in or approximates to the enclosed area (e.g., treating the enclosed area as the surrounding area), and recognizes text in the region using OCR technology.

In one embodiment, the image text extraction application 125 receives several candidate OCR'ed texts for a text region from the server 110 and provides them to the user for selection. For example, the image text extraction application 125 lists the candidate texts next to (or above) the displayed image in a sequence determined by their garbage scores. The user can select one of the candidate texts by touching its display.

The image text extraction application 125 then uses the selected candidate OCR'ed text as the recognized text of the text region.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for selectively recognizing text in images based on user underline gestures. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for selectively recognizing text in an image, comprising:
    displaying the image on a touch sensitive display device;
    detecting a gesture made on the touch sensitive display device;
    identifying an area of the image associated with the gesture;
    determining an angle of the area of the image and a horizontal axis of the touch sensitive display device;
    calculating a plurality of projection profiles of a plurality of angles for at least a portion of the image, the plurality of angles determined based on the angle of the area of the image;
    identifying a horizontal projection profile in the plurality of projection profiles based on variances of the plurality of projection profiles;
    determining a skew angle based on an angle of the horizontal projection profile;
    correcting the skew angle by rotating the area of the image; and
    identifying a text region in the rotated area; and
    recognizing text in the text region using OCR technology.

2. The computer-implemented method of claim 1, wherein identifying the text region further comprises identifying the text region responsive to the gesture made on the touch sensitive display.

3. The computer-implemented method of claim 1, further comprising:
    cropping the image to form a cropped image including the text region;
    wherein recognizing the text comprises:
        transmitting the cropped image to an OCR engine through a computer network; and
        receiving the text from the OCR engine through the computer network.

4. The computer-implemented method of claim 1, wherein recognizing the text comprises:
    transmitting the image and location information about the text region in the image to an OCR engine through a computer network; and
    receiving the text from the OCR engine through the computer network.

5. The computer-implemented method of claim 1, wherein identifying the area of the image associated with the gesture comprises detecting an underline gesture on the touch sensitive display device.

6. The computer-implemented method of claim 5, wherein the underline gesture is vertical relative to an orientation of the image and wherein the text in the text region comprises text displayed vertically.

7. The computer-implemented method of claim 1, wherein identifying the area of the image comprises detecting a circling gesture on the touch sensitive display device.

8. A non-transitory computer-readable storage medium encoded with executable computer program code for selectively recognizing text in an image, the computer program code comprising program code for:
    displaying the image on a touch sensitive display device;
    detecting a gesture made on the touch sensitive display device;
    identifying an area of the image associated with the gesture;

determining an angle of the area of the image and a horizontal axis of the touch sensitive display device;

calculating a plurality of projection profiles of a plurality of angles for at least a portion of the image, the plurality of angles determined based on the angle of the area of the image;

identifying a horizontal projection profile in the plurality of projection profiles based on variances of the plurality of projection profiles;

determining a skew angle based on an angle of the horizontal projection profile;

correcting the skew angle by rotating the area of the image; and identifying a text region in the rotated area; and recognizing text in the text region using OCR technology.

9. The non-transitory computer-readable storage medium of claim 8, wherein identifying the text region further comprises identifying the text region responsive to the gesture made on the touch sensitive display.

10. The non-transitory computer-readable storage medium of claim 8, wherein the computer program code further comprises program code for:

cropping the image to form a cropped image including the text region;

wherein recognizing the text comprises:
transmitting the cropped image to an OCR engine through a computer network; and
receiving the text from the OCR engine through the computer network.

11. The non-transitory computer-readable storage medium of claim 8, wherein recognizing the text comprises:

transmitting the image and location information about the text region in the image to an OCR engine through a computer network; and receiving the text from the OCR engine through the computer network.

12. The non-transitory computer-readable storage medium of claim 8, wherein identifying the area of the image associated with the gesture comprises detecting an underline gesture on the touch sensitive display device.

13. The non-transitory computer-readable storage medium of claim 12, wherein the underline gesture is vertical relative to an orientation of the image and wherein the text in the text region comprises text displayed vertically.

14. The non-transitory computer-readable storage medium of claim 8, wherein identifying the area of the image comprises detecting a circling gesture on the touch sensitive display device.

15. A computer system for selectively recognizing text in an image, comprising:

a computer-readable storage medium comprising executable computer program code for:

an image User Interface (UI) module for displaying the image on a touch sensitive display device and detecting a gesture made on the touch sensitive display device;

a text region identification module for identifying a text region in the image displayed on the touch sensitive display device, the text region comprising text, wherein identifying the text in the image comprises:

identifying an area of the image associated with the gesture;

determining an angle of the area of the image and a horizontal axis of the touch sensitive display device;

calculating a plurality of projection profiles of a plurality of angles for at least a portion of the image, the plurality of angles determined based on the angle of the area of the image;

identifying a horizontal projection profile in the plurality of projection profiles based on variances of the plurality of projection profiles;

determining a skew angle based on an angle of the horizontal projection profile;

correcting the skew angle by rotating the area of the image; and identifying the text region in the rotated area; and an OCR module for recognizing text in the text region using OCR technology.

16. The computer system of claim 15, wherein the text region identification module configured for identifying the text region further comprises identifying the text region responsive to the gesture made on the touch sensitive display.

17. The computer system of claim 15, wherein the text region identification module is further configured for:

cropping the image to form a cropped image including the text region;

wherein the OCR module is further configured for:
transmitting the cropped image to an OCR engine through a computer network; and
receiving the text from the OCR engine through the computer network.

18. The computer system of claim 15, wherein the OCR module is further configured for:

transmitting the image and location information about the text region in the image to an OCR engine through a computer network; and receiving the text from the OCR engine through the computer network.

19. The computer system of claim 15, wherein identifying the area of the image associated with the gesture comprises detecting an underline gesture on the touch sensitive display device.

20. The computer system of claim 19, wherein the underline gesture is vertical relative to an orientation of the image and wherein the text in the text region comprises text displayed vertically.

* * * * *